United States Patent
Chen et al.

(10) Patent No.: US 11,463,472 B2
(45) Date of Patent: Oct. 4, 2022

(54) UNKNOWN MALICIOUS PROGRAM BEHAVIOR DETECTION USING A GRAPH NEURAL NETWORK

(71) Applicant: NEC Laboratories America, Inc., Princeton, NJ (US)

(72) Inventors: Zhengzhang Chen, Princeton Junction, NJ (US); Ding Li, Franklin Park, NJ (US); Zhichun Li, Princeton, NJ (US); Shen Wang, Chicago, IL (US)

(73) Assignee: NEC Corporation

( * ) Notice: Subject to any disclaimer, the term of this patent is extended or adjusted under 35 U.S.C. 154(b) by 457 days.

(21) Appl. No.: 16/653,259

(22) Filed: Oct. 15, 2019

(65) Prior Publication Data
US 2020/0137083 A1    Apr. 30, 2020

Related U.S. Application Data

(60) Provisional application No. 62/816,500, filed on Mar. 11, 2019, provisional application No. 62/749,691, filed on Oct. 24, 2018.

(51) Int. Cl.
| | |
|---|---|
| *H04L 29/06* | (2006.01) |
| *H04L 9/40* | (2022.01) |
| *G06K 9/62* | (2022.01) |
| *G06F 16/901* | (2019.01) |
| *G06N 3/04* | (2006.01) |

(52) U.S. Cl.
CPC ........ *H04L 63/145* (2013.01); *G06F 16/9024* (2019.01); *G06K 9/6218* (2013.01); *G06N 3/04* (2013.01); *H04L 63/1416* (2013.01)

(58) Field of Classification Search
CPC ............... H04L 63/1416; H04L 63/145; G06F 16/9024; G06K 9/6218; G06N 3/04
See application file for complete search history.

(56) References Cited

U.S. PATENT DOCUMENTS

| | | | |
|---|---|---|---|
| 2016/0378975 A1* | 12/2016 | Pikhur | G06F 21/52 726/23 |
| 2018/0069885 A1* | 3/2018 | Patterson | G06F 21/554 |
| 2019/0098032 A1* | 3/2019 | Murphey | G06F 9/4498 |

OTHER PUBLICATIONS

Damodaran, "A Comparison of Static, Dynamic, and Hybrid Analysis for Malware Detection", Journal of Computer Virology and Hacking Techniques, vol. 13, No. 1, Feb. 2017, 24 pages.

David, "Structural Analysis of Binary Executable Headers for Malware Detection Optimization", Journal of Computer Virology and Hacking Techniques, vol. 13, No. 2, May 2017, pp. 87-93.

(Continued)

*Primary Examiner* — Jeffrey C Pwu
*Assistant Examiner* — Thong P Truong
(74) *Attorney, Agent, or Firm* — Joseph Kolodka

(57) ABSTRACT

A method for detecting malicious program behavior includes performing program verification based on system activity data, analyzing unverified program data identified from the program verification to detect abnormal events, including analyzing host-level events to detect abnormal host-level events by learning a program representation as a graph embedding through an attentional architecture based on an invariant graph between different system entities, generating detection results based on the analysis, and performing at least one corrective action based on the detection results.

17 Claims, 7 Drawing Sheets

(56) References Cited

OTHER PUBLICATIONS

Babic, "Malware Analysis with Tree Automata Inference", Proceedings of the 23rd International Conference on Computer Aided Verification, Jul. 2011, pp. 116-131.
Bernardi, "Dynamic Malware Detection and Phylogeny Analysis Using Process Mining", International Journal of Information Security, Jun. 2018, 22 pages.
Jha, "Synthesizing Near-Optimal Malware Specifications from Suspicious Behaviors", Proceedings of the 8th International Conference on Malicious and Unwanted Software, Oct. 2013, pp. 41-50.
Rieck, "Learning and Classification of Malware Behavior", Detection of Intrusions and Malware, and Vulnerability Assessment, 2008, pp. 116-287.
Saracino, "Effective and Efficient Behavior-Based Android Malware Detection and Prevention", IEEE Transactions on Dependable and Secure Computing, vol. 15, No. 1, Jan. 2018, 14 pages.

\* cited by examiner

UNKNOWN MALICIOUS PROGRAM BEHAVIOR DETECTION USING A GRAPH NEURAL NETWORK

RELATED APPLICATION INFORMATION

This application claims priority to provisional application Ser. Nos. 62/749,691, filed on Oct. 24, 2018, and 62/816,500, filed on Mar. 11, 2019, incorporated by reference herein in their entirety.

BACKGROUND

Technical Field

The present invention relates to intrusion detection, and more particularly to unknown malicious program behavior detection used a graph neural network.

Description of the Related Art

With information systems playing ubiquitous and indispensable roles in many modern industries, cybersecurity bears strong importance in daily system management to prevent potentially significant breaches. However, computer systems, such as enterprise networks, are facing more and more sophisticated attack from malicious computer programs or malware. Examples of such attacks include, e.g., advanced persistent threats (APTs). Current malicious program detection systems and methods may not be sufficient to detect such attacks. For example, signature-based malicious program detection methods can only detect known malware and are prone to evasion techniques (e.g., binary obfuscation), while behavior-based approaches may heavily rely on malware training samples and thus incur prohibitively high training costs.

SUMMARY

According to an aspect of the present invention, a method for detecting unknown malicious program behavior is provided. The method includes performing program verification based on system activity data, analyzing unverified program data identified from the program verification to detect abnormal events, including analyzing host-level events to detect abnormal host-level events by learning a program representation as a graph embedding through an attentional architecture based on an invariant graph between different system entities, generating detection results based on the analysis, and performing at least one corrective action based on the detection results.

In accordance with another embodiment of the present invention, a system for detecting unknown malicious program behavior is provided. The system includes a memory device for storing program code and at least one processor device operatively coupled to the memory device. The at least one processor device is configured to execute program code stored on the memory device to perform program verification based on system activity data, analyze unverified program data identified from the program verification to detect abnormal events by analyzing host-level events to detect abnormal host-level events by learning a program representation as a graph embedding through an attentional architecture based on an invariant graph between different system entities, generate detection results based on the analysis, and perform at least one corrective action based on the detection results.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
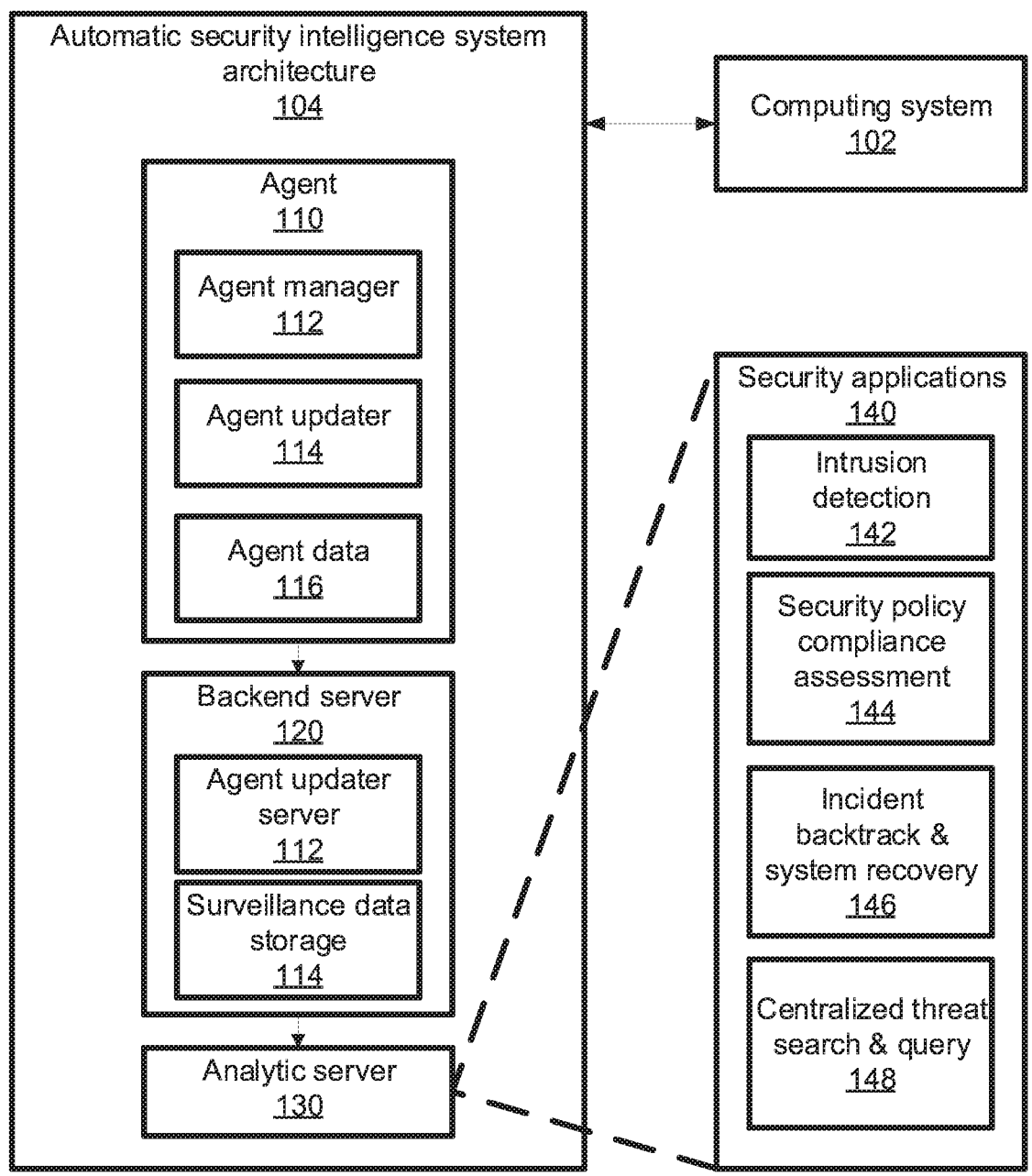
FIG. 1 is a block/flow diagram of a high-level overview of a system for detecting unknown malicious program behavior, in accordance with an embodiment of the present invention.

As an introduction, consider a phishing e-mail attack used to exploit a known vulnerability in which an adversary steals sensitive data from a database by sending a phishing e-mail attached with a malicious file to one or more users associated with one or more computing devices (e.g., Information Technology (IT) staff). When a user opens the attached file through a browser using a computing device, a malicious macro can be triggered to compromise the computing device. The malicious macro can create and execute a malware executable, which can pretend to be a benign executable. This malware can then open a backdoor to the adversary, subsequently allowing the adversary to read and dump data from the target database via the compromised computing device.

In this example, since the adversary can make the malicious program from scratch with binary obfuscation, signature-based approaches can fail due to the lack of known malicious signatures. Moreover, behavior-based approaches may not be effective unless the detection model had previously been trained using the malware sample. Thus, signature-based or behavior-based malware detection approaches generally do not work well in detecting the malicious program.

Additionally, host-level anomaly detection techniques, which can locally extract patterns from process events as discriminators of abnormal behavior, are based on observations of single operations and sacrifice the false positive rate to detect the malicious program. For example, host-level anomaly detection can detect a fake executable by capturing a database read, but a Structured Query Language (SQL)

client may also exhibit the same operation. If the database read is simply detected, normal SQL clients may also be classified as abnormal program instances and thus false positives will be generated. However, too many false positives can lead to an alert fatigue problem, which can result in the failure of cyber-analysts to "catch up" with attacks. Accordingly, host-level anomaly detection techniques fail to account for higher semantic-level context.

To address at least some of the drawbacks noted above, the embodiments described herein can detect malicious program behaviors of programs running in a computer system to account for higher semantic-level context of program instances. As used herein, a malicious program is a process that behaves differently from all existing benign programs. Examples of malicious program behaviors include, but are not limited to, running unknown programs, an abnormally acting known program, etc. Such malicious activities can signal that the computer system is comprised. Additionally, the embodiments described herein can be applied to detect malicious program behaviors within any suitable computer system in accordance with the embodiments described herein. Examples of such computer systems can include, but are not limited to, enterprise systems, Internet of Things (IoT) systems, Operational Technology (OT) systems, etc.

The embodiments described herein can be used to detect malware that is unknown to the execution environment ("unknown malware"). More formally, given a target program with corresponding process event data (e.g., a program opens a file or connects to a server) during a time window, it can be determined whether the behavior of the target program is similar to that of any existing benign programs. If at least one program sufficiently similar to the target program exists, the embodiments described herein can output the top-k most similar programs with their corresponding identifiers (IDs) and/or names and similarity scores. Otherwise, an alert can be triggered since this indicates that the target program is unknown to the execution environment. Accordingly, the malicious program detection described herein can be integrated within a computer system as a first line of defense against unknown attacks to the computer system, and can improve intrusion detection accuracy within computer systems by, e.g., detecting malware attacks with fewer false positives.

The malicious behavior detection described herein can implement graph embedding and deep learning techniques to learn normal features of system dynamic activities. For example, the embodiments described herein can utilize a data-driven deep learning system and method based on a Graph Neural Network (GNN) for detecting malicious programs that can learn a graph representation and similarity metric simultaneously based on invariant graph modeling of the program's execution behaviors. GNN can be used to learn the representation of the graph, in the node level or graph level, and can be used to accelerate convolution operations, extend the current graph convolution and reduce computational cost.

More specifically, the embodiments described herein can implement a heterogeneous graph matching framework that formulates malicious program detection as a heterogenous graph matching problem. For example, a heterogeneous invariant graph can be generated to capture interactions/ dependencies between different pairs of system entities, and a program representation can be learned from the heterogeneous invariant graph. In one embodiment, an attentional heterogeneous GNN with heterogeneity-aware contextual search and a dense-connected aggregator can be used to learn the program representation from the heterogeneous invariant graph. A model (e.g., Siamese-network-based model) can be used to train the parameters and compute the similarity scores between an unknown program and the existing benign programs. Since the model can be trained on existing benign programs, as opposed to malware/malicious program samples, an unknown malicious program having a behavioral representation sufficiently different to any of the existing benign programs can be identified.

Referring now in detail to the figures in which like numerals represent the same or similar elements and initially to FIG. 1, a block/flow diagram is provided illustrating a block/flow diagram of a high-level overview of an exemplary system 100. The system can include a computing system 102 and an automatic security intelligence (ASI) architecture 104.

The computing system 102 can include one or more computing devices associated with one or more end-users. For example, the computing system 102 can include at least one of an enterprise computing system or network, an IoT system, an OT system, etc.

The ASI architecture 104 can include an agent 110, a backend server 120 and an analysis server 130.

The agent 110 is configured to collect operational data (e.g., security surveillance data) within the computing system 102. For example, although not explicitly shown in FIG. 1, the agent 110 can be installed on a computing device or machine in the computing system 102. As shown, the agent 110 can include an agent manager 112, an agent updater 114 and agent data 116. The agent manager 112 is configured to customize data collection rules and manage data collection process of each agent. The agent updater is configured to automatically control the software update of the agent at each host. The agent data 116 can illustratively include active process data, file access data, network socket data, inter-process communication (IPC) data, and host information data. Although only one agent 110 is shown, any suitable number of agents can be utilized in accordance with the embodiments described herein.

The backend server 120 is configured to receive data from the agent 110, pre-process the data, and send the pre-processed data to the analysis server. For example, as shown, the backend server 120 can include an agent updater server 122 and surveillance data storage 124. The agent updater server 122 is configured to automatically control the software update of the agent at each host. The surveillance data storage 124 is configured to store data including security surveillance data.

The analysis server 130 is configured to implement one or more security application programs 140 to analyze the pre-processed data. As shown, the one or more security application programs 140 can include an intrusion detection engine 142 configured to detect any possible intrusion from sources inside or outside of the computing system 102, a security policy compliance assessment engine 144 configured to assess security policy compliance within the computing system 102, an incident backtrack & system recovery engine 146 configured to implement incident backtracking and system recovery, and a centralized threat search & query engine 148 configured to implement centralized threat search and querying.

As will be described in further detail below with reference to FIG. 2, the intrusion detection engine 142 can detect possible intrusions by performing malicious computer program behavior detection. More specifically, the intrusion detection engine 142 can perform malicious computer program behavior detection by implementing graph embedding and deep learning techniques to learn normal features of system dynamic activities.

The ASI architecture 104 (e.g., the intrusion detection engine 142) can be further configured to perform at least one corrective action based on results of the intrusion detection. In one embodiment, performing the at least one corrective action can include transmitting the detection results to the computing system 102. For example, the detection results can be output as a visualization (e.g., a GUI), a program behavior report, etc. More specifically, the program behavior report can include any malicious program behaviors that were detected. At least one end-user can utilize the results to determine the existence of an attack on the underlying computing system 102, and can thus seek to mitigate or prevent the attack from compromising data on the computing system 102.

Other exemplary corrective actions that can be performed include, but are not limited to, changing a security setting for an application or hardware component, changing an operational parameter of an application or hardware component (e.g., an operating speed), halting and/or restarting an application, halting and/or rebooting a hardware component, changing an environmental condition, changing a network interface's status or settings, etc. Accordingly, the system 100 can automatically correct or mitigate unknown malicious program behavior.

Figure 2:
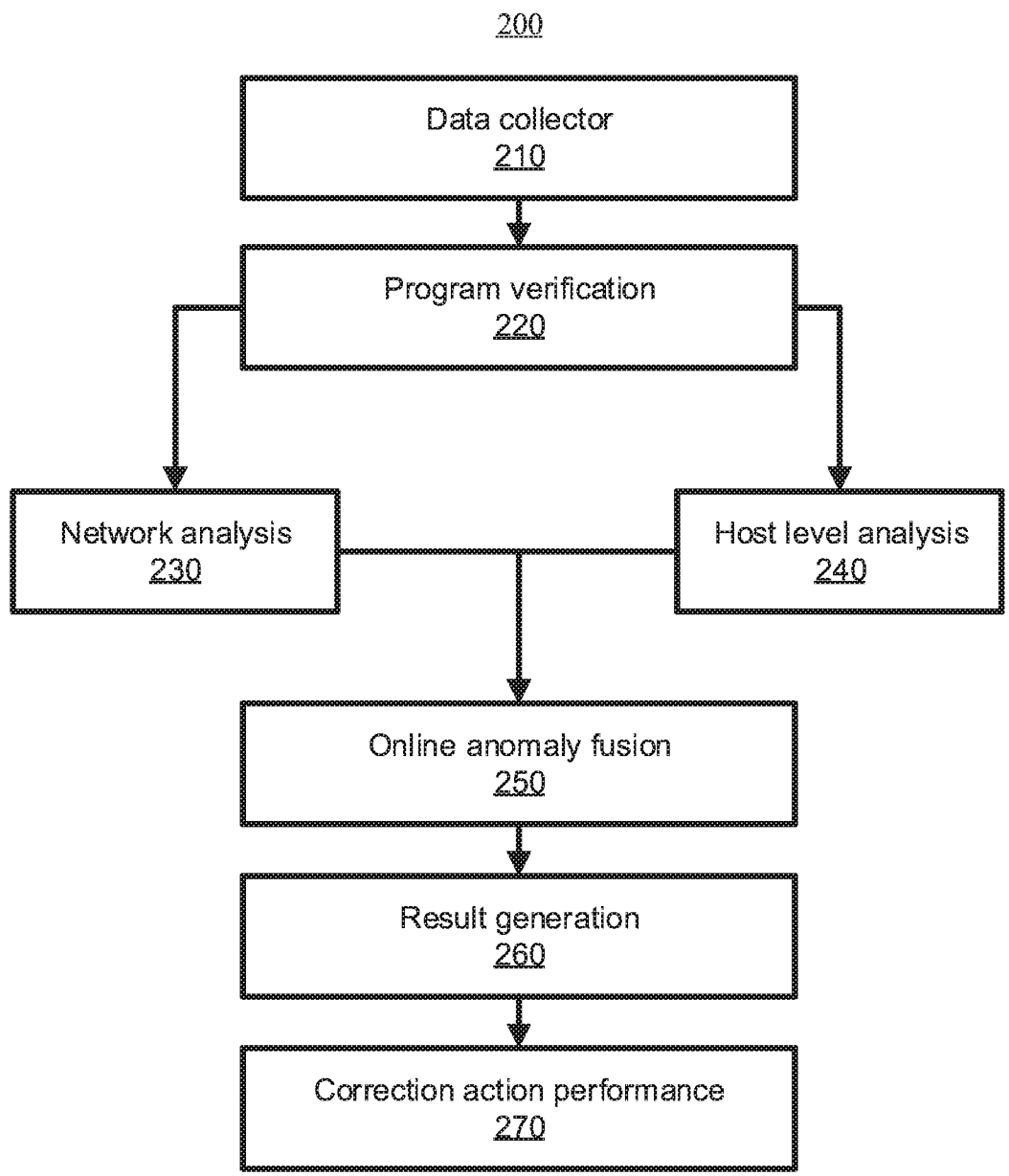
FIG. 2 is a block/flow diagram of an exemplary intrusion detection engine, in accordance with an embodiment the present invention.

With reference to FIG. 2, a block/flow diagram is provided illustrating an exemplary intrusion detection engine 200, such as the intrusion detection engine 142 of FIG. 1.

As shown, the engine 200 includes a data collector component 210. The component 210 is configured to receive system activity data from a backend server (e.g., the backend server 120 of FIG. 1).

The engine 200 further includes a program verification component 220 configured to receive the data from the component 210 and perform program data verification based on the received data. The component 220 is further configured to distribute unverified program data to a network analysis component 230 and a host-level analysis component 240. More specifically, network event data is distributed to the component 230 and host-level event data to the component 240.

Components 210 and 220 can collectively form what is referred to herein as a data distributor component.

The component 230 is configured to detect abnormal communication events ("network anomalies") by processing network communications (e.g., Transmission Control Protocol (TCP) or User Datagram Protocol (UDP)).

The component 240 is configured to detect abnormal host-level events ("host-level anomalies") by processing host-level events, including but not limited to process-to-process, process-to-file, process-to-Internet socket, etc. Further details regarding component 240 will be described below with reference to FIG. 3.

As further shown, the engine 200 further includes an online anomaly fusion component 250 configured to integrate the network and host-level anomalies received from components 230 and 240, and refine the results for trustworthy intrusion events, a result generation component 260 configured to generate detection results, and a corrective action performance component 270 configured to perform at least one corrective action based on the detection results.

In one embodiment, performing the at least one corrective action can include transmitting the detection results to at least one computing device associated with at least one end-user. For example, the detection results can be output as a visualization (e.g., a GUI), a program behavior report, etc. More specifically, the program behavior report can include any malicious program behaviors that were detected. The at least one end-user can utilize the results to determine the existence of an attack on the underlying computing system, and can thus seek to mitigate or prevent the attack from compromising data on the computing system.

Other exemplary corrective actions that can be performed include, but are not limited to, changing a security setting for an application or hardware component, changing an operational parameter of an application or hardware component (e.g., an operating speed), halting and/or restarting an application, halting and/or rebooting a hardware component, changing an environmental condition, changing a network interface's status or settings, etc. Accordingly, the intrusion detection engine 200 can automatically correct or mitigate unknown malicious program behavior.

Figure 3:
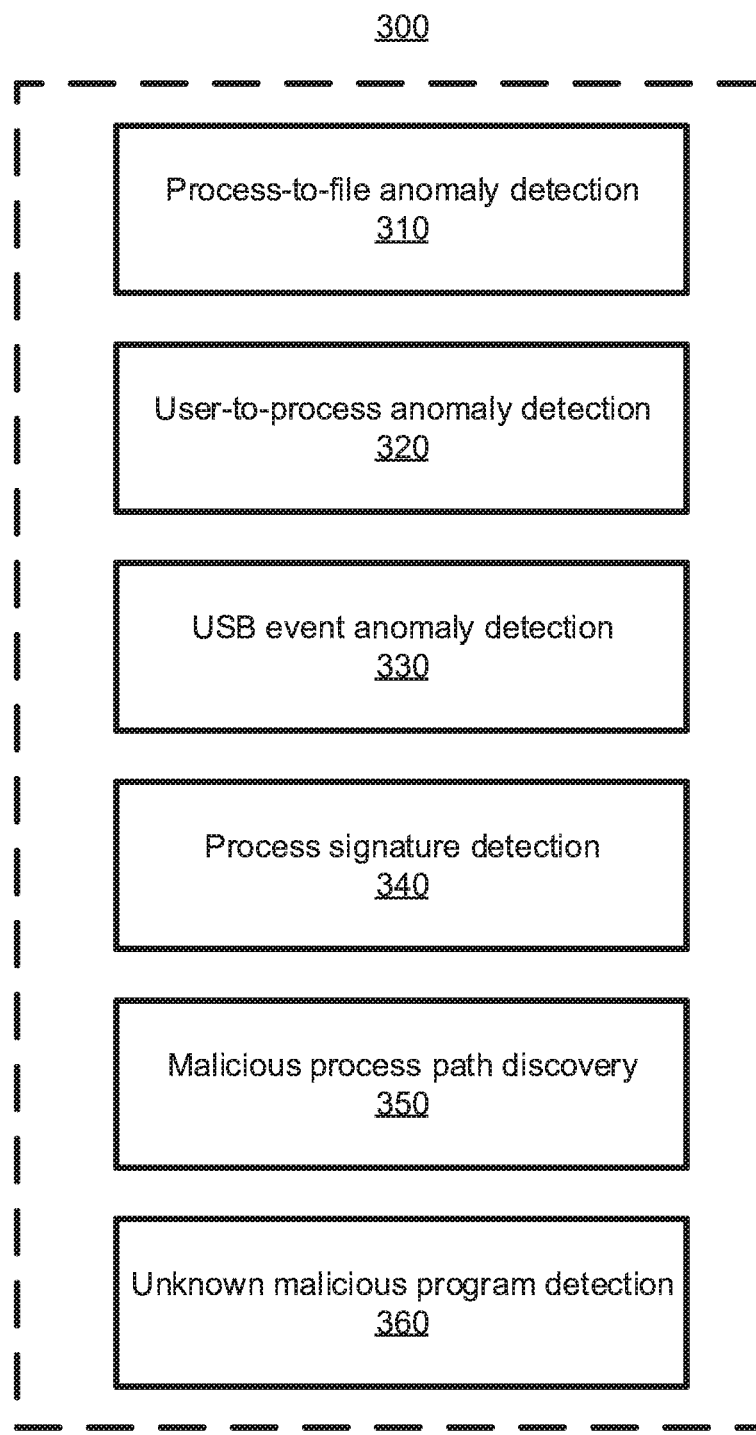
FIG. 3 is a diagram of an exemplary host-level analysis component, in accordance with an embodiment the present invention.

With reference to FIG. 3, a block/flow diagram is provided illustrating an exemplary host-level analysis component 300, such as the host-level analysis component 240 of FIG. 2.

As shown, the component 300 includes a process-to-file anomaly detection component 310 configured to receive host-level process-to-file events and discover abnormal process-to-file events.

The component 300 further includes a user-to-process anomaly detection component 320 configured to receive streaming process events, model user behavior at the process level for one or more users, and identify suspicious processes ran by each user.

The component 300 further includes a universal serial bus (USB) event anomaly detection component 330 configured to receive streaming process events, and identify USB device-related events.

The component 300 further includes a process signature detection component 340 configured to receive process names and signatures, and detect processes with suspicious signatures.

The component 300 further includes a malicious process path discovery component 350 configured to receive current active processes as starting points, and track all possible process paths by combining incoming/previous events in a user-defined time window.

The component 300 further includes an unknown malicious program detection component 360 configured to detect unknown malicious programs. More specifically, component 360 is configured to receive current active processes and track unknown/new processes from the current active processes by comparing process behaviors of the current active process with process behaviors of existing programs in a user-defined time window. Further details regarding component 360 will now be described below with reference to FIG. 4.

Figure 4:
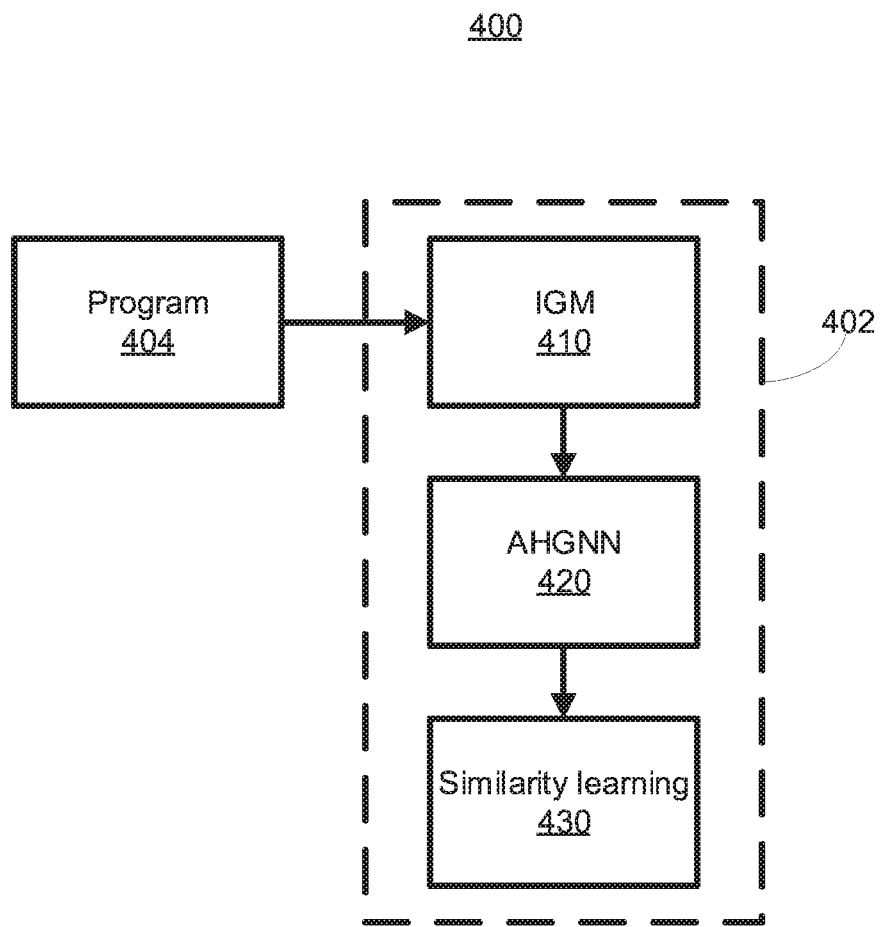
FIG. 4 is a diagram of an exemplary unknown malicious program detection component, in accordance with an embodiment of the present invention.

With reference to FIG. 4, a diagram is provided illustrating an exemplary architecture 400 for an unknown malicious program detection component 402, such as the unknown malicious program detection component 360 of FIG. 3.

As shown, the architecture 400 can include an invariant graph modeling (IGM) component 410, an attentional heterogeneous graph neural network (AHGNN) component 420 and a similarity learning component 430. The AHGNN component 420 can also be referred to as a hierarchical attentional graph neural encoder (HAGNE).

The IGM component 410 is configured to model system event data as an invariant graph to capture program behavior profile. More specifically, the invariant graph can be a heterogeneous graph between different system entities (e.g., processes, files and Internet sockets). A global program-dependency profile can be obtained using the invariant graph modeling described herein.

More formally, given the event data U across several machines within a time window (e.g., one day), each target program can be represented by a heterogeneous graph G=(V, E), in which V denotes a set of vertices or nodes. Each node can represent an entity. Examples of such entities can include, but are not limited to, processes, files, and Internet sockets, where P can denote the set of processes, F can denote the set of files and I can denote the set of Internet sockets. For example, V=P∪F∪I. E denotes a set of edges (dependencies) ($v_s$, $v_d$, r) between a source entity $v_s$ and a destination entity $v_d$ with relation r. The relation r corresponds to a causal dependency. Examples of relations include, but are not limited to, a process forking another process (P→P), a process accessing a file (P→F), and a process connecting to an Internet socket (P→I). Each graph can further be associated with an adjacency matrix A.

The invariant graph constructed by the component 410 can be heterogeneous with multiples types of entities and relations, which can make it difficult to directly apply a GNN to learn the graph representation. To address such a concern, the component 420 is configured to learn the program representation as a graph embedding through an attentional architecture that considers node-wise, layer-wise and path-wise context importance. The component 420 can include a plurality of subcomponents, as will now be described with reference to FIG. 5.

Figure 5:
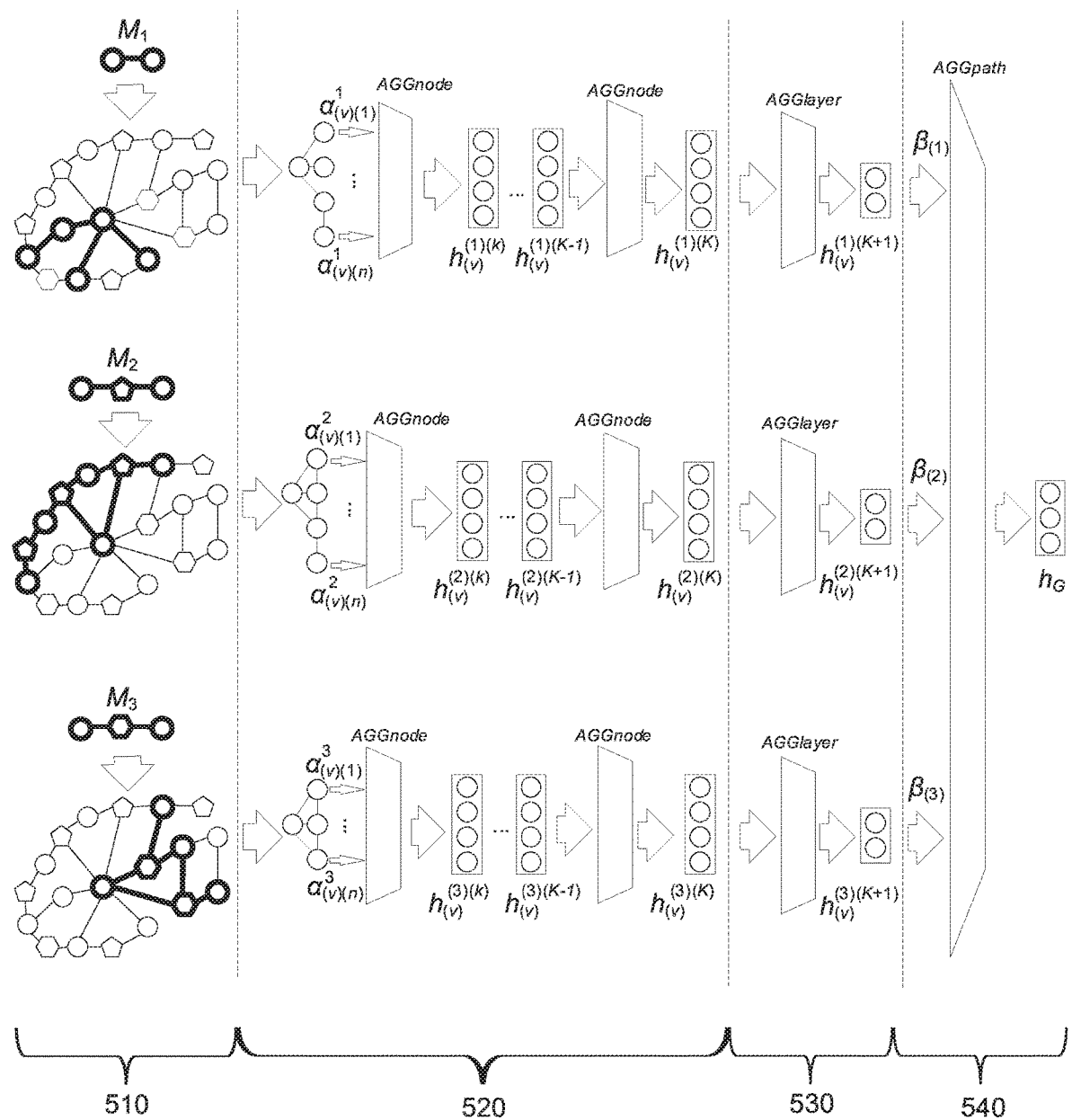
FIG. 5 is a diagram of the operation of an exemplary an attentional heterogeneous graph neural network component, in accordance with an embodiment of the present invention.

With reference to FIG. 5, a diagram is provided illustrating an exemplary architecture 500 of an attentional heterogeneous graph neural network (AHGNN) component, such as the AHGNN component 420 of FIG. 4.

For example, as shown in this illustrative example, the component 500 can include a contextual search subcomponent 510, a node-wise attentional neural aggregator subcomponent 520, a layer-wise dense-connected neural aggregator subcomponent 530, and a path-wise attentional neural aggregator subcomponent 540.

For a heterogeneous invariant graph G, simply aggregating one-hop neighbors for a target node cannot capture the semantic and structural correlations among different types of entities. To address this issue, the subcomponent 510 is configured to perform a contextual search (e.g., heterogeneity-aware contextual search) based on the graph G.

As used herein, a meta-path is a path that connects different entity types via a sequence of relations in a heterogeneous graph. In a computer system, a meta-path could be, e.g., a process forking another process (P→P), two processes accessing a same file (P←F→P), two processes opening the same Internet socket (P←I→P), etc., with each one defining a unique relationship between two programs.

From the graph G, a set of n meta-paths M={$M_1$, $M_2$, ..., $M_n$} can be generated with each meta-path $M_i$ representing a unique multi-hop relationship between two programs. For each meta-path $M_i$, a path-relevant neighbor set $N_v^i$ of a node v can be defined as $N_v^i$={u|(u, v)∈$M_i$(v, u)∈$M_i$} where u is a reachable neighbor of v via the meta-path $M_i$. Accordingly, the subcomponent 510 finds path-relevant sets of neighbors under the guide of the meta-paths.

After constructing the path-relevant neighbor set such contexts can be leveraged via neighborhood aggregation. However, due to noisy neighbors, different neighboring nodes may have different impacts on the target node. Hence, it may be unreasonable to treat all neighbors equally.

To address this issue, the subcomponent 520 is configured to compute an attentional weight for each node in the path-relevant neighbor set $N_v^i$. The subcomponent 520 can generate node embeddings by selectively aggregating the entities based on a random walk technique to compute relevance scores between pairs of nodes of the graph G. For example, the random walk technique can include a random walk with restarts (RWR) technique extended to a heterogeneous graph, such that the walker starts at the target program node v and, at each step, only moves to one of its neighboring nodes in the path-relevant neighbor set $N_v^i$ instead of to all linked nodes without considering semantics. After the random walk finishes, each visited neighbor can receive a visiting count. The $L_1$ normalization of the visiting count can be computed and used as the node-wise attentional weight.

More formally, for $N_v^i$={$u_1^i$, ..., $u_n^i$}, attentional weights can be represented by $\alpha_{(v)(:)}^i$=[$\alpha_{(v)(1)}^i$, ..., $\alpha_{(v)(n)}^i$], where $\alpha_{(v)(j)}^i$ is the weight of $u_j^i$. Then, the program representation can be computed via a neural aggregation function $AGG_{node}$( ) by:

$$h_v^{(i)(k)} = AGG_{node}(h_v^{(i)(k-1)}, \{h_u^{(i)(k-1)}\}) = MLP^{(k)}\left((1+\epsilon^{(k)})h_v^{(i)(k-1)} + \sum_u \alpha_{(u)(:)}^i h_u^{(i)(k-1)}\right)$$

where k∈{1, 2, ... K} denotes the index of the layer, $h_v^{(i)(k)}$ is the program embedding (e.g., feature vector) of program v for meta-path $M_i$ at the k-th layer, $\epsilon^{(k)}$ is a trainable parameter that quantifies the trade-off between the previous layer representation and the aggregated contextual representation, $h_u^{(i)(0)}$ is initialized by $X_v$, and MLP denotes a multi-layer perceptron that can be applied to transform the aggregated representation to a hidden nonlinear space. Accordingly, the subcomponent 520 can leverage contextual information while considering the difference importance of each of the neighbors.

A simple way to aggregate the information from a wider range of neighbors is to stack multiple node-wise neural aggregators. However, the performance of a GNN model often cannot be improved because, by adding more layers, it may be easy to propagate the noisy information from an exponentially increasing number of neighbors in a deep layer.

To address these issues, the subcomponent 530 is configured to perform layer-wise dense-connected neural aggregation. The subcomponent 530 can aggregate the node embeddings generated from different layers toward a dense-connected node embedding. More specifically, the subcomponent 530 can leverage all the intermediate representations, with each capturing a subgraph structure. All of the intermediate representations can be aggregated by concatenation followed by an MLP, such that the resulting embedding can adaptively select different subgraph structures.

More formally, a neural aggregation function, AGGlayer 0, can be constructed as follows:

$$h_v^{(i)(K+1)} = AGG_{layer}(h_v^{(0)}, h_b^{(1)}, ..., h_v^{(K)}) = MLP)([h_v^{(0)}; h_v^{(1)}; ...; h_v^{(K)}])$$

where ";" represents a concatenation operation.

After the node-wise and layer-wise aggregations are performed by the subcomponents 520 and 530, respectively, different embeddings corresponding to different meta-paths are generated. However, different meta-paths should not be treated equally. For example, ransomware is generally very active in accessing files, but barely forks another process or an internet socket. Moreover, VPNFilter is generally very active in opening an internet socket, but it barely accesses a file or forks another process.

To address this issue, subcomponent 540 is configured to aggregate the embeddings generated from different path-relevant neighbor sets. The subcomponent 540 can automatically learn the attentional weights for different meta-paths and compute the joint embedding.

More formally, given a program embedding $h_v^{(i)(K+1)}$ corresponding to a target meta-path $M_i$ and a program embedding $h_v^{(j)(K+1)}$ corresponding to another meta-path $M_j$, a path-wise attentional weight $\beta_i$ can be defined as follows:

$$\beta_i = \frac{\exp(\sigma(b[W_b h_v^{(i)(K+1)} \| W_b h_v^{(j)(K+1)}]))}{\sum_{j' \in |M|} \exp(\sigma(b[W_b h_v^{(i)(K+1)} \| W_b h_v^{(j')(K+1)}]))}$$

where b denotes a trainable attention vector, $W_b$ denotes a trainable weight matrix mapping the input features to the hidden space, "∥" denotes the concatenation operation, and a denotes the nonlinear gating function. A feed-forward neural network can be formulated, which computes the correlation between one path-relevant neighbor set and other path-relevant neighbors sets. This correlation can be normalized by, e.g., a Softmax function. For example, the joint representation for all the meta-paths can be represented as follows:

$$h_G = AGG_{path} = \sum_{i=1}^{|M|} ATT(h_v^{(i)(K+1)}) h_v^{(i)(K+1)}$$

Accordingly, the subcomponent 540 can allow for improved inferring of the importance of different meta-paths by leveraging their correlations to learn a path-aware representation.

Referring back to FIG. 4, in order to perform effective graph matching, the component 430 is configured to train the component 420 to improve the ability of the component 420 to distinguish between an unknown program and known benign programs. The component 430 can learn a similarity metric and program graph representation jointly for better graph matching between the unknown program and known benign programs.

In one embodiment, the component 430 can be configured to train the parameters of the AHGNN and learn the similarities via one or more Siamese networks. A Siamese network is a neural network including two or more identical subnetwork components, which can be used to distinguish similar and dissimilar objects.

More specifically, the Siamese network can include two identical AHGNNs or HAGNEs to compute the program graph representation independently. Each AHGNN can receive a program graph snapshot and generate a corresponding program embedding $h_G$. A neural network can then be used to fuse the two program embeddings, and a similarity score of the two program embeddings can be output. During training, P pairs of program graph snapshots ($G_{i(1)}$, $G_{i(2)}$), i∈{1, 2, . . . P} can be collected with corresponding ground truth pairing information $y_1 \in \{+1, -1\}$. If the pair of graph snapshots belong to the same program, the ground truth label is $y_1=+1$, otherwise its ground truth label is $y_1=-1$.

For each pair of program snapshots, a score function can be used to measure the similarity of the two program embeddings. In one embodiment, the score function can be a cosine score function. In this embodiment, the output of the component 430 can be defined as follows:

$$Sim(G_{i(1)}, G_{i(2)}) = \cos((h_{G_{i(1)}}, h_{G_{i(2)}})) = \frac{h_{G_{i(1)}} \cdot h_{G_{i(2)}}}{\|h_{G_{i(1)}}\| \cdot \|h_{G_{i(2)}}\|}$$

and the corresponding objective function 1 can be formulated as:

$$l = \sum_{i=1}^{P} ((Sim(G_{i(1)}, G_{i(2)})) - y_i)^2$$

The objective function 1 can be optimized using any suitable technique in accordance with the embodiments described herein. With the help of similarity learning, the parameters that keep similar embeddings closer can be learned while pushing dissimilar embeddings apart by directly optimizing the embedding distance. Since the distance between the two programs can be optimized directly, this model can be used to perform unknown malware detection.

As an overview, given the snapshot of an unknown program, its corresponding program invariant graph can be constructed and used to generate the program embedding. Then, the distance scores (e.g., cosine distance scores) between the embeddings of the unknown program and the embeddings of the existing programs in the database can be computed. If an existing program has more than one embedding generated from multiple graph snapshots, only the highest similarity score will be reported with respect to the unknown program. Then, the all of the similarity scores can be ranked. If the highest similarity score among all the existing similarity scores are below a threshold, an alert can be triggered. Otherwise, the top-k most similar programs can be reported.

Figure 6:
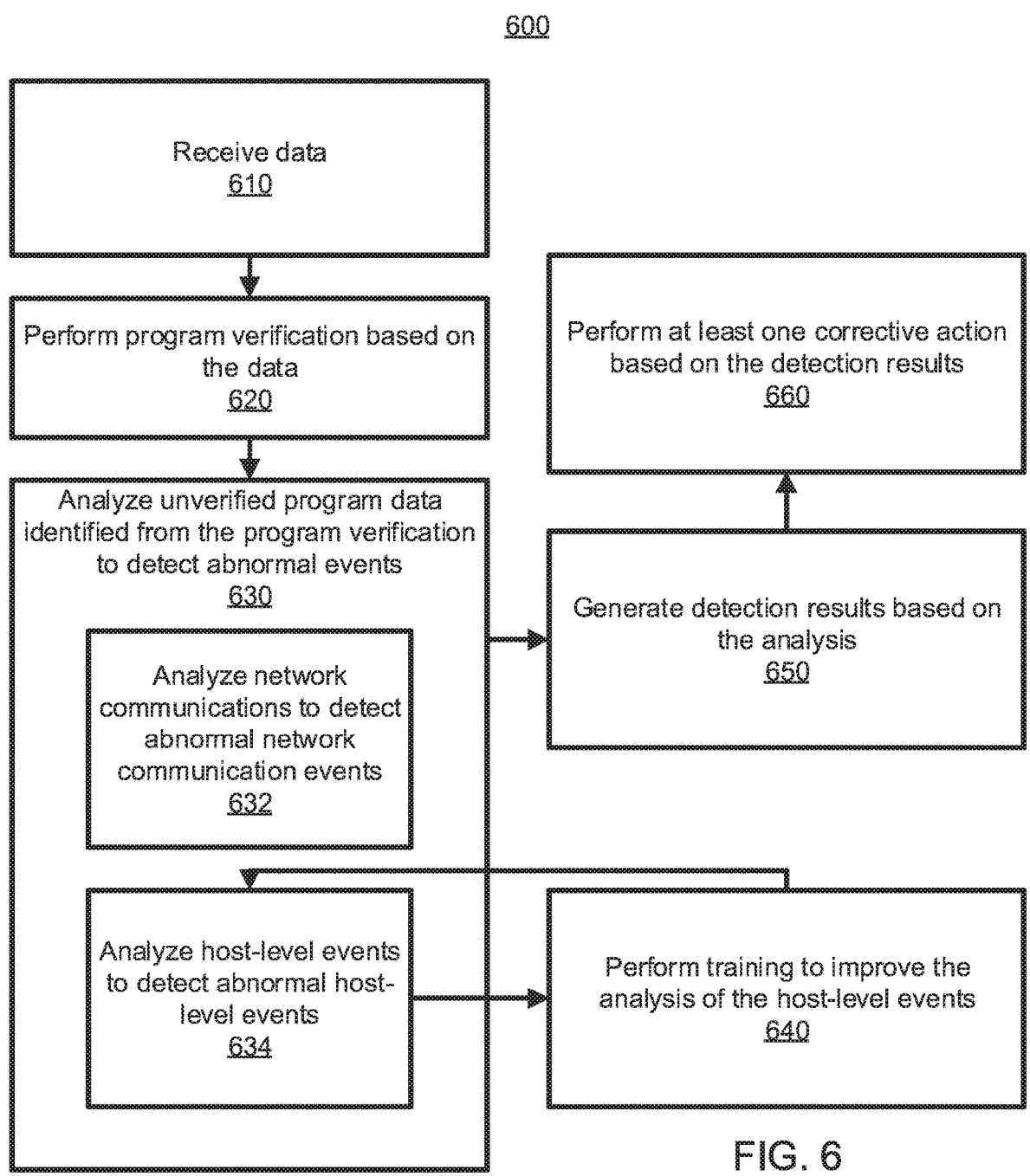
FIG. 6 is a block/flow diagram illustrating a system/method for detecting unexpected program behavior, in accordance with an embodiment of the present invention.

With reference to FIG. 6, a block/flow diagram is provided illustrating a system/method 600 for detecting unknown malicious program behavior. The system/method 600 can be used as part of an intrusion detection security application implemented by a computing device (e.g., server) of a security intelligence system architecture to detect abnormal host-level events or host-level anomalies.

At block 610, data is received. The data can include system activity data associated with a computing system (e.g., an enterprise computing system or network). For example, the data can be received from a backend server.

At block 620, program verification is performed based on the data.

Further details regarding blocks 610 and 620 are described above with reference to FIGS. 1-2.

At block 630, unverified program data identified from the program verification is analyzed to detect abnormal events. Analyzing the unverified program data can include, at block 632, analyzing network communications (e.g., TCP or UDP) to detect abnormal network communication events and, at block 634, analyzing host-level events (e.g., process-to-process, process-to-file, and process-to-Internet socket) to detect abnormal host-level events.

Analyzing the host-level events at block 634 can include receiving current active processes, and tracking unknown/new processes from the current active processes by comparing process behaviors of the current active process with process behaviors of existing programs in a user-defined time window.

More specifically, analyzing the host-level events at block 634 can include modeling system event data as an invariant graph to capture a program behavior profile. The invariant graph can be a heterogeneous graph between different system entities (e.g., processes, files and Internet sockets).

Analyzing the host-level events at block 634 can further include learning a program representation as graph embedding through an attentional architecture (e.g., an AHGNN architecture). The attention architecture considers node-wise, layer-wise and path-wise context importance. More specifically, learning the program representation can include performing a contextual search based on the invariant graph to determine path-relevant neighbor sets, computing a node-wise attentional weight for each node in the path-relevant neighbor sets to generate node embeddings from different layers, aggregating the node embeddings toward a dense-connected node embedding, and automatically learning path-wise attentional weights for respective meta-paths to compute a joint embedding.

At block 640, training is performed to improve the analysis of the host-level events. For example, the AHGNN architecture can be trained to better distinguish between an unknown program and a known benign program. More specifically, the AHGNN architecture can be trained by learning a similarity metric and program graph representation jointly for better graph matching between the unknown program and known benign programs. In one embodiment, the parameters of the AHGNN can be trained via one or more Siamese networks.

Further details regarding blocks 630-640 are described above with reference to FIGS. 2-5.

At block 650, detection results are generated based on the analysis. Generating the detection results can include integrating the abnormal network communication and host-level events to obtain integrated data, and refining the integrated data for trustworthy events to generate the detection results.

At block 660, at least one corrective action is performed based on the detection results. In one embodiment, performing the at least one corrective action can include transmitting the detection results to at least one computing device associated with at least one end-user. For example, the detection results can be output as a visualization (e.g., a GUI), a program behavior report, etc. More specifically, the program behavior report can include any malicious program behaviors that were detected. The at least one end-user can utilize the results to determine the existence of an attack on the underlying computing system, and can thus seek to mitigate or prevent the attack from compromising data on the computing system.

Other exemplary corrective actions that can be performed include, but are not limited to, changing a security setting for an application or hardware component, changing an operational parameter of an application or hardware component (e.g., an operating speed), halting and/or restarting an application, halting and/or rebooting a hardware component, changing an environmental condition, changing a network interface's status or settings, etc. Accordingly, the system/method 600 can automatically correct or mitigate unknown malicious program behavior.

Further details regarding blocks 650 and 660 are described above with reference to FIGS. 1 and 2.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
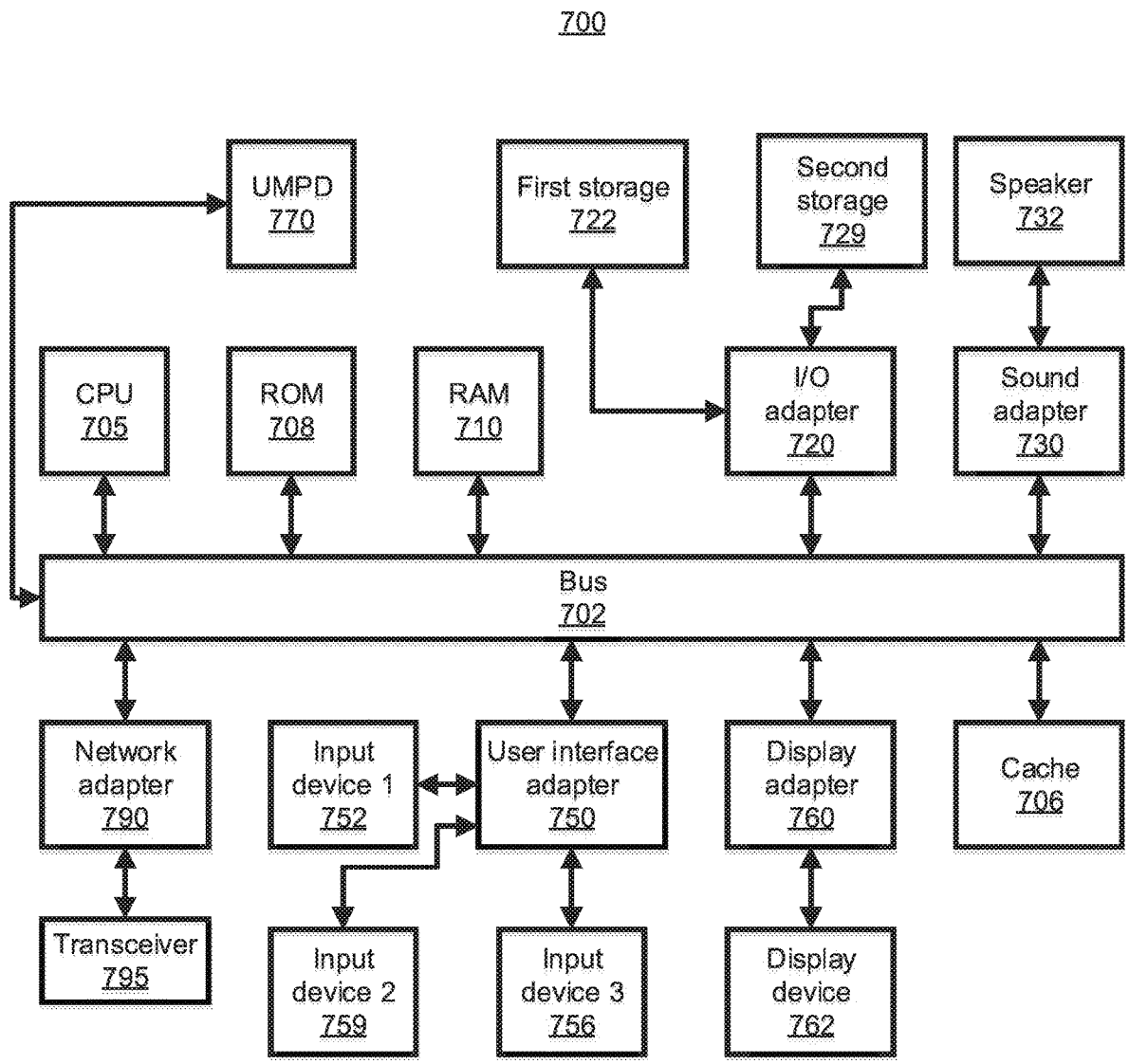
FIG. 7 is a block/flow diagram illustrating a computer system, in accordance with an embodiment the present invention.

Referring now to FIG. 7, an exemplary computer system 700 is shown which may represent a server or a network device, in accordance with an embodiment of the present invention. The computer system 700 includes at least one processor (CPU) 705 operatively coupled to other components via a system bus 702. A cache 706, a Read Only Memory (ROM) 708, a Random-Access Memory (RAM) 710, an input/output (I/O) adapter 720, a sound adapter 730, a network adapter 790, a user interface adapter 750, and a display adapter 760, are operatively coupled to the system bus 702.

A first storage device 722 and a second storage device 729 are operatively coupled to system bus 702 by the I/O adapter 720. The storage devices 722 and 729 can be any of a disk storage device (e.g., a magnetic or optical disk storage device), a solid state magnetic device, and so forth. The storage devices 722 and 729 can be the same type of storage device or different types of storage devices.

A speaker 732 may be operatively coupled to system bus 702 by the sound adapter 730. A transceiver 795 is operatively coupled to system bus 702 by network adapter 790. A display device 762 is operatively coupled to system bus 702 by display adapter 760.

A first user input device 752, a second user input device 759, and a third user input device 756 are operatively coupled to system bus 702 by user interface adapter 750. The user input devices 752, 759, and 756 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 752, 759, and 756 can be the same type of user input device or different types of user input devices. The user input devices 752, 759, and 756 are used to input and output information to and from system 700.

Unknown malicious program detection (UMPD) component 770 may be operatively coupled to system bus 702. UMPD component 770 is configured to perform one or more of the operations described above. UMPD component 770 can be implemented as a standalone special purpose hardware device, or may be implemented as software stored on a storage device. In the embodiment in which UMPD component 770 is software-implemented, although shown as a separate component of the computer system 800, MPD component 770 can be stored on, e.g., the first storage device 722 and/or the second storage device 729. Alternatively, MPD component 770 can be stored on a separate storage device (not shown).

Of course, the computer system 700 may also include other elements (not shown), as readily contemplated by one of skill in the art, as well as omit certain elements. For example, various other input devices and/or output devices can be included in computer system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 700 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for detecting unknown malicious program behavior, the method comprising:

performing, via the processor, program verification based on system activity data;

analyzing, via the processor, unverified program data identified from the program verification to detect abnormal events, including analyzing host-level events to detect abnormal host-level events by learning a program representation as a graph embedding through an attentional architecture based on an invariant graph between different system entities;

generating detection results based on the analysis;

performing, via the processor, at least one corrective action based on the detection results;

performing, via the processor, a contextual search based on the invariant graph to determine path-relevant neighbor sets;

computing, via the processor, a node-wise attentional weight for each node in the path-relevant neighbor sets to generate node embeddings from different layers;

aggregating, via the processor, the node embeddings toward a dense-connected node embedding; and automatically learning path-wise attention weights for respective meta-paths to compute a joint embedding.

2. The method of claim 1, wherein:

analyzing the unverified program data further includes analyzing network communications to detect abnormal network communication events, the network communications being associated with Transmission Control Protocol (TCP) or User Datagram Protocol (UDP); and the host-level events are selected from the group consisting of: process-to-process, process-to-file, process-to-Internet socket, and combinations thereof.

3. The method of claim 1, wherein analyzing the host-level events further includes:

modeling the system event data as the invariant graph to capture a program behavior profile; and learning the program representation as a graph embedding through an attentional architecture including an attentional heterogeneous graph neural network (AHGNN).

4. The method of claim 3, further comprising training the attentional architecture to distinguish between an unknown program and a known benign program, including learning a similarity metric and the program graph representation jointly for improved graph matching between the unknown program and the known benign program.

5. The method of claim 1, wherein generating the detection results further includes integrating the abnormal events to obtain integrated data, and refining the integrated data for trustworthy events.

6. The method of claim 1, wherein performing the corrective action further includes performing at least one corrective action selected from the group consisting of: transmitting the detection results to at least one computing device associated with at least one end-user, changing a security setting for an application or hardware component, changing an operational parameter of an application or hardware component, halting or restarting an application or hardware component, changing an environmental condition, and changing status of a network interface.

7. A computer program product comprising a non-transitory computer readable storage medium having program instructions embodied therewith, the program instructions executable by a computer to cause the computer to perform a method for detecting unknown malicious program behavior, the method performed by the computer comprising:

performing program verification based on system activity data;

analyzing unverified program data identified from the program verification to detect abnormal events, including analyzing host-level events to detect abnormal host-level events by learning a program representation as a graph embedding through an attentional architecture based on an invariant graph between different system entities;

generating detection results based on the analysis;

performing a corrective action based on the detection results;

performing a contextual search based on the invariant graph to determine path-relevant neighbor sets;

computing a node-wise attentional weight for each node in the path-relevant neighbor sets to generate node embeddings from different layers;

aggregating the node embeddings toward a dense-connected node embedding; and automatically learning path-wise attention weights for respective meta-paths to compute a joint embedding.

8. The computer program product of claim 7, wherein:
analyzing the unverified program data further includes analyzing network communications to detect abnormal network communication events, the network communications being associated with Transmission Control Protocol (TCP) or User Datagram Protocol (UDP); and
the host-level events are selected from the group consisting of: process-to-process, process-to-file, process-to-Internet socket, and combinations thereof.

9. The computer program product of claim 7, wherein analyzing the host-level events further includes:
modeling the system event data as the invariant graph to capture a program behavior profile; and
learning the program representation as a graph embedding through an attentional architecture including an attentional heterogeneous graph neural network (AHGNN).

10. The computer program product of claim 9, wherein the method further includes training the attentional architecture to distinguish between an unknown program and a known benign program, including learning a similarity metric and the program graph representation jointly for improved graph matching between the unknown program and the known benign program.

11. The computer program product of claim 7, wherein generating the detection results further includes integrating the abnormal events to obtain integrated data, and refining the integrated data for trustworthy events.

12. The computer program product of claim 7, wherein performing the corrective action further includes performing at least one corrective action selected from the group consisting of: transmitting the detection results to at least one computing device associated with at least one end-user, changing a security setting for an application or hardware component, changing an operational parameter of an application or hardware component, halting or restarting an application or hardware component, changing an environmental condition, and changing status of a network interface.

13. A system for detecting unknown malicious program behavior, comprising:

a memory device for storing program code; and at least one processor device operatively coupled to a memory device and configured to execute program code stored on the memory device to:
perform program verification based on system activity data;
analyze unverified program data identified from the program verification to detect abnormal events by analyzing host-level events to detect abnormal host-level events by learning a program representation as a graph embedding through an attentional architecture based on an invariant graph between different system entities;
generate detection results based on the analysis;
perform at least one corrective action based on the detection results;
perform a contextual search based on the invariant graph to determine path-relevant neighbor sets;
compute a node-wise attentional weight for each node in the path-relevant neighbor sets to generate node embeddings from different layers;
aggregate the node embeddings toward a dense-connected node embedding; and
automatically learn path-wise attention weights for respective meta-paths to compute a joint embedding.

14. The system of claim 13, wherein the at least one processor device is further configured to analyze the unverified program data further by analyzing network communications to detect abnormal network communication events, the network communications being associated with Transmission Control Protocol (TCP) or User Datagram Protocol (UDP), wherein the host-level events are selected from the group consisting of: process-to-process, process-to-file, process-to-Internet socket, and combinations thereof.

15. The system of claim 13, wherein the at least one processor device is further configured to analyze the host-level events by:
modeling the system event data as the invariant graph to capture a program behavior profile; and
learning the program representation as a graph embedding through an attentional architecture including an attentional heterogeneous graph neural network (AHGNN).

16. The system of claim 15, wherein the at least one processor device is further configured to execute program code stored on the memory device to train the attentional architecture to distinguish between an unknown program and a known benign program by learning a similarity metric and program graph representation jointly for improved graph matching between the unknown program and the known benign program.

17. The system of claim 13, wherein the at least one processor device is further configured to perform the corrective action by performing at least one corrective action selected from the group consisting of: transmitting the detection results to at least one computing device associated with at least one end-user, changing a security setting for an application or hardware component, changing an operational parameter of an application or hardware component, halting or restarting an application or hardware component, changing an environmental condition, and changing status of a network interface.

* * * * *